(12) United States Patent  
Eguchi et al.

(10) Patent No.: US 6,338,246 B2
(45) Date of Patent: Jan. 15, 2002

(54) EXHAUST PASSAGE CONTROL VALVE

(75) Inventors: Yoshihiko Eguchi; Kazuhiko Tsuda; Masamichi Fujishiro, all of Tochigi-ken; Jun Fukazawa, Gunma-ken; Shoji Ichikawa, Aichi-ken, all of (JP)

(73) Assignees: Honda Giken Kogyo Kabushiki Kaisha; Sankei Kogyo Kabushiki Kaisha, both of Tokyo; Chuo Hatsujo Kabushiki Kaisha, Aichi-Ken, all of (JP)

( * ) Notice: Subject to any disclaimer, the term of this patent is extended or adjusted under 35 U.S.C. 154(b) by 0 days.

(21) Appl. No.: 09/764,075

(22) Filed: Jan. 19, 2001

(30) Foreign Application Priority Data

Jan. 21, 2000 (JP) ............................................ 12-013381

(51) Int. Cl.$^7$ ................................................. F01N 7/10
(52) U.S. Cl. ............................ 60/324; 60/292; 60/322; 181/241; 181/237; 181/254; 181/279; 137/529; 137/535
(58) Field of Search .......................... 60/324, 322, 312, 60/292, 293; 181/241, 237, 254, 277, 278, 279; 137/529, 535; 123/65 PE, 65 V, 65 EM

(56) References Cited

U.S. PATENT DOCUMENTS

| | | | | |
|---|---|---|---|---|
| 4,903,486 A | * | 2/1990 | Finkle | .......................... 60/324 |
| 5,435,347 A | * | 7/1995 | Gillingham | .................. 137/599 |
| 5,785,014 A | * | 7/1998 | Cornwell | ................. 123/65 PE |
| 5,971,098 A | * | 10/1999 | Suzuki et al. | ................ 181/254 |
| 6,176,347 B1 | * | 1/2001 | Chae et al. | .................. 181/254 |
| 6,189,650 B1 | * | 2/2001 | Inuzuka et al. | ............. 181/254 |

FOREIGN PATENT DOCUMENTS

JP          11-287118          10/1999

* cited by examiner

Primary Examiner—Thomas Denion
Assistant Examiner—Binh Tran
(74) Attorney, Agent, or Firm—Sughrue Mion, PLLC

(57) ABSTRACT

An exhaust passage control valve has a valve element of a spiral shape mounted on a valve seat portion of a housing through which exhaust gases from an engine pass. The valve element is urged by a valve spring in a direction of closing the valve. A spring constant of the valve spring is kept low without enlarging the valve spring, and there can be obtained opening and closing characteristics in that the valve opens at a stretch when an exhaust-gas pressure has reached a predetermined value. As the valve spring, a helical torsion spring having a coiled cylindrical body portion is used. Arm portions on both ends of a coiled cylindrical body portion are engaged with a pair of spring receiving members. The spring receiving members are disposed in the housing on circumferentially opposite sides of the valve seat portions. The arm portion are engaged with the spring receiving members so as to be slidable in a longitudinal direction of the arm portions. The valve element is thus urged, in a direction of closing the valve, through the coiled cylindrical body portion.

1 Claim, 7 Drawing Sheets

EXHAUST PASSAGE CONTROL VALVE

BACKGROUND OF THE INVENTION

1. Field of the Invention

The present invention relates to an exhaust passage control valve which is used as a bypass valve to open and close a bypass passage of a silencer which is interposed in an exhaust system of an engine.

2. Description of Related Art

An exhaust passage control valve is provided with: a housing through which exhaust gases from an engine passes; a valve element mounted on the housing; and a valve spring for urging the valve element toward a closing side such that, when an exhaust-gas pressure has exceeded a predetermined value, the exhaust passage control valve is opened.

Conventionally, as an exhaust passage control valve, there has hitherto been ordinarily used a butterfly valve which is opened and closed by rotation of a valve element about a shaft. In this valve, bearings are required to support the shaft of the valve element, resulting in a higher cost. As a solution, there has been proposed the following valve in Japanese Published Unexamined Patent Application No. 287118/1999 as a low-cost exhaust passage control valve which does not require bearings. Namely, it employs a spiral valve element whose outer circumferential (or peripheral) portion is seated onto an annular valve seat portion of a housing of the valve. The exhaust passage control valve is thus opened and closed by extension and contraction of the valve element along an axis of spiral winding of the spiral valve element.

In this example, the housing has fixed thereto a spring receiving member in a posture to lie opposite to the opening direction of the valve element. Between this spring receiving member and the valve element, there is interposed a valve spring which is made up of a compression coil spring.

In the above-described exhaust passage control valve in which the valve element of a spiral shape is urged by the compression coil spring toward the closing side of the valve, there was a disadvantage in that vibrations between opening state and closing state of the valve element occurred when an exhaust-gas pressure is operated upon. In addition, in order to attain opening and closing characteristics of the valve in that, when the exhaust-gas pressure has reached a predetermined value, the valve is opened all at once or suddenly and, when the exhaust-gas pressure has become smaller than the predetermined value, the valve is closed all at once, it becomes necessary to increase a winding diameter and the number of winding to thereby set a spring constant at a low level. As a result, the valve spring becomes large in size and the minimizing the size of the exhaust passage control valve becomes difficult.

In view of the above-described points, the present invention has an object of providing an exhaust passage control valve in which the spring constant can be set at a low level without enlarging the valve spring and in which the vibrations between opening state and closing state of the valve element be effectively prevented.

SUMMARY OF THE INVENTION

In order to attain the above and other objects, the present invention is an exhaust passage control valve comprising: a housing through which exhaust gases from an engine pass; a valve element mounted on the housing; and a valve spring for urging the valve element toward a closing side such that, when an exhaust-gas pressure has exceeded a predetermined value, the exhaust passage control valve is opened. The valve element is constituted into a spiral valve element whose outer circumferential portion is seated onto an annular valve seat portion of the housing such that the exhaust passage control valve is opened and closed by extension and contraction of the valve element in a direction of an axis of spiralling. The valve spring is constituted by a helical torsion spring having a coiled cylindrical body portion, and an arm portion on each end of the coiled cylindrical body portion. The arm portions are engaged with a pair of spring receiving members so as to be slidable in a longitudinal direction of each of the arm portions, the pair of spring receiving members being provided in those portions of the housing which lie on circumferentially opposite sides of the valve seat portion to thereby urge the valve element through the coiled cylindrical body portion toward the closing side.

According to the present invention, the urging force in the direction of closing the valve element can be obtained mainly by the deflection reaction force of the arm portions on both sides of the helical torsion spring. The amount of deflection of the arm portion at an initial state is set so that a predetermined set load can be obtained. Here, if the coiled cylindrical body portion of the helical torsion spring is displaced in the opening direction of the valve element due to the extension of the valve element in the opening direction thereof, the arm portions slide relative to the spring receiving members. As a result, the effective length of the arm portions giving rise to the deflection force becomes large. Therefore, the deflection reaction force in the arm portion does not increase much, and the spring constant can be made low without increasing the size of the valve spring. In addition, accompanied by the movement of the valve element, there will occur a sliding friction in the arm portions with the spring receiving members, as well as a friction among the spirals of the coiled spring member in the coiled cylindrical body portion. The vibration dampening effect can thus be obtained due to the frictions, and the vibrations between opening state and closing state of the valve element can be effectively prevented.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
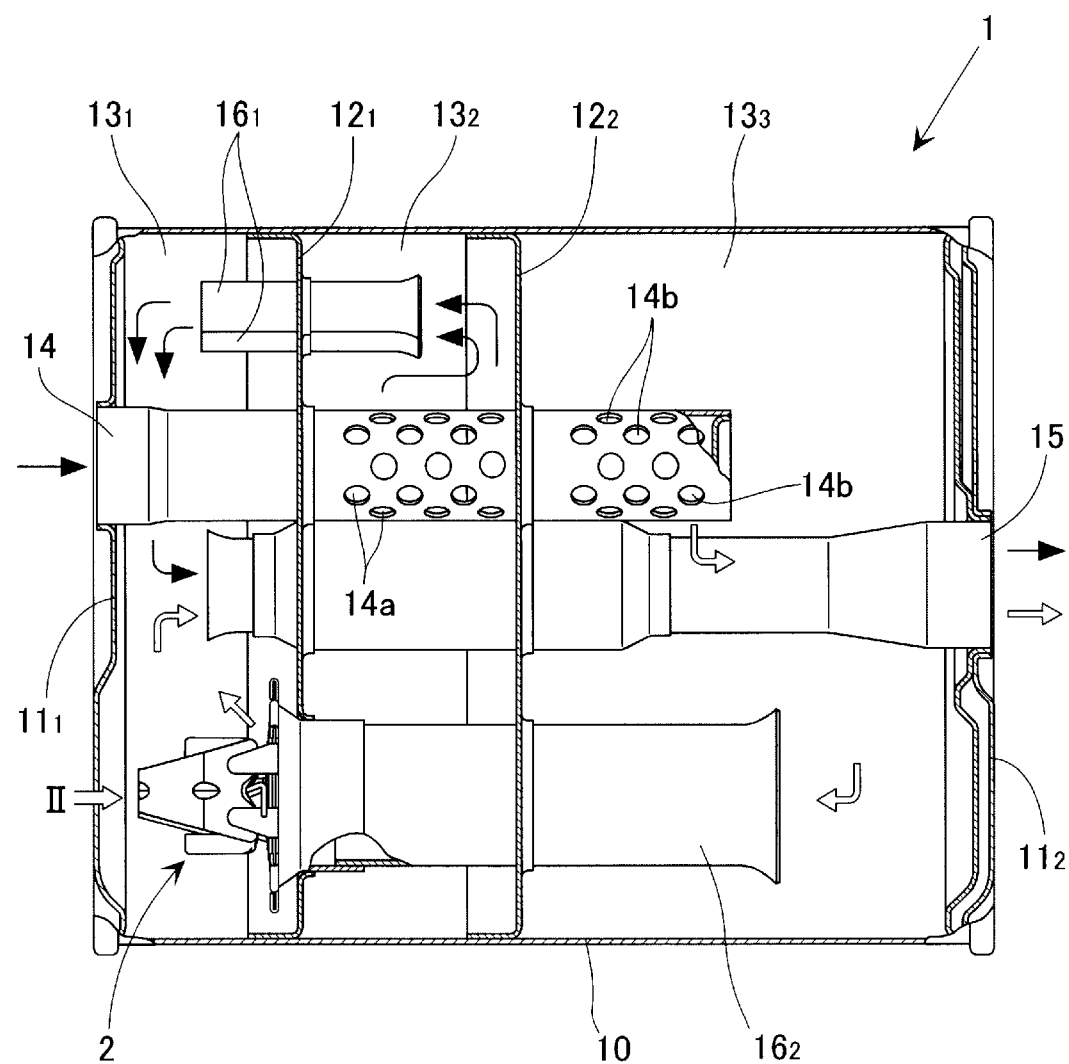
FIG. 1 is a sectional view of a silencer which is provided with an exhaust passage control valve according to the present invention.
Figure 2:
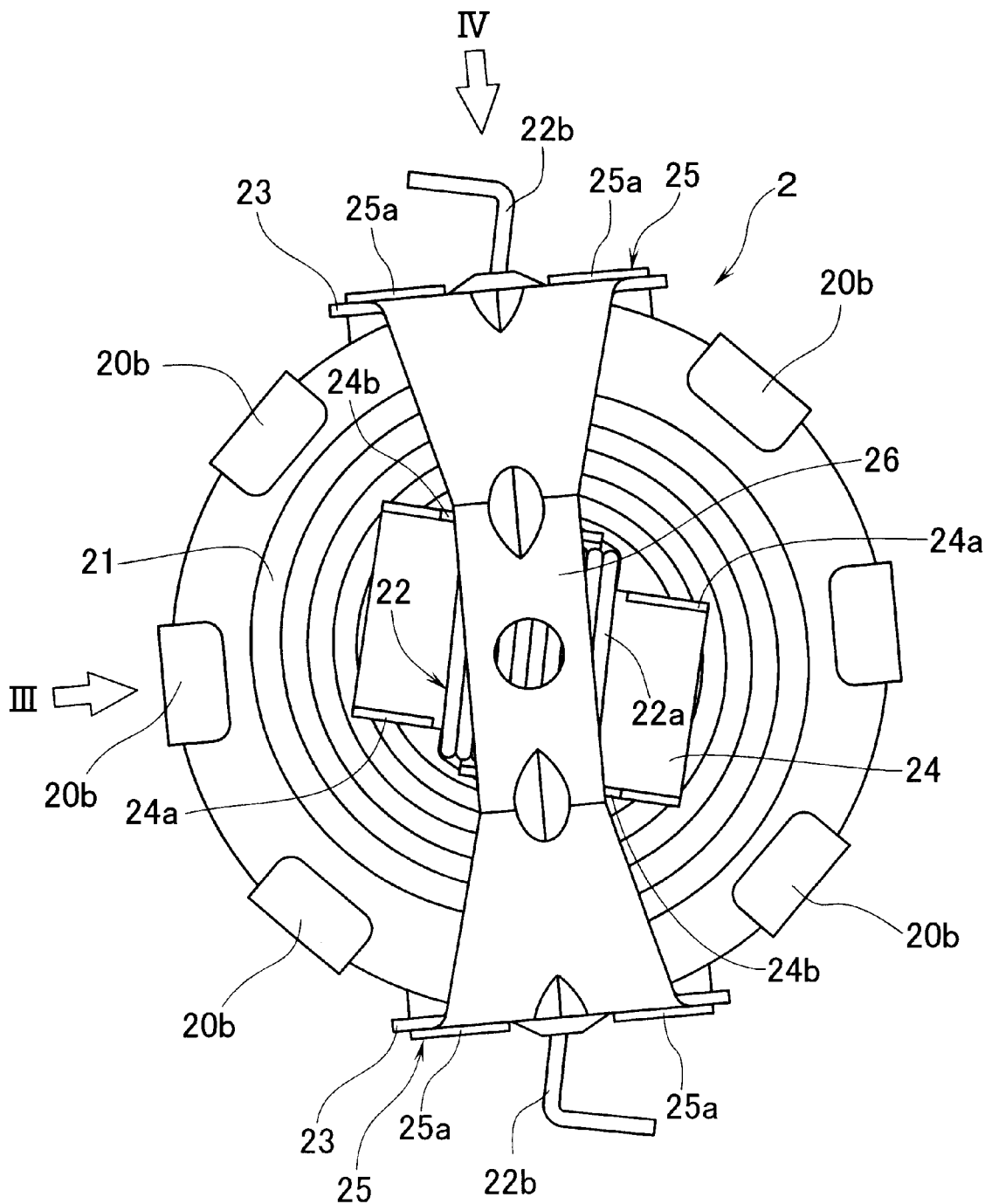
FIG. 2 is an enlarged front view of the exhaust passage control valve as seen in the direction of an arrow II in FIG. 1.
Figure 3:
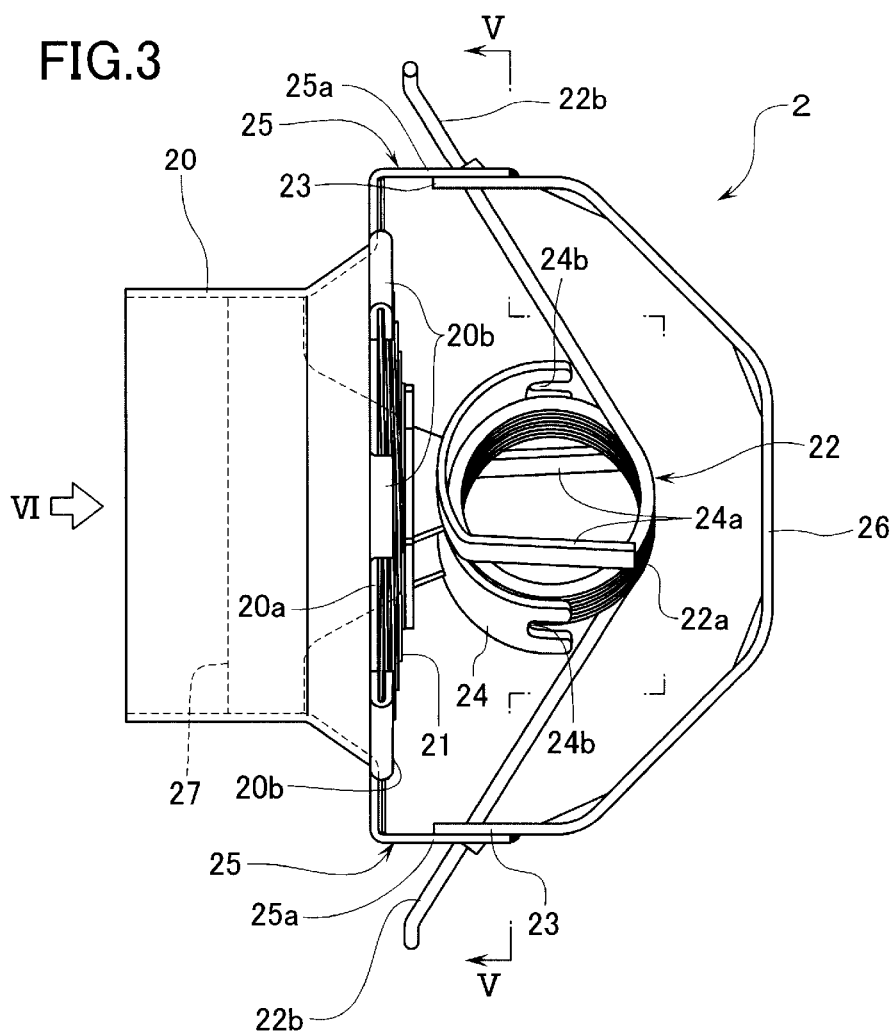
FIG. 3 is a side view of the exhaust passage control valve as seen in the direction of an arrow III in FIG. 2.
Figure 4:
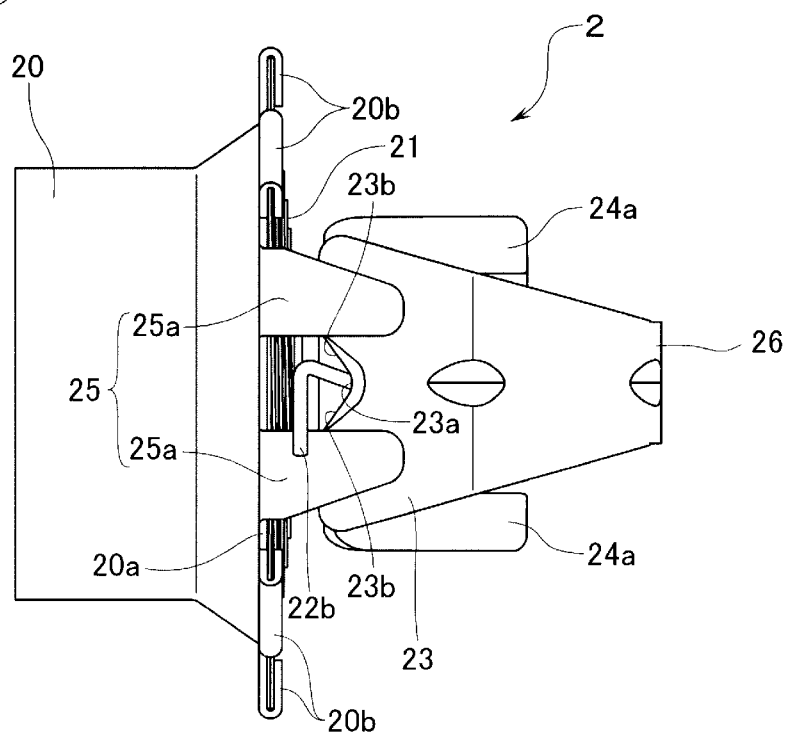
FIG. 4 is a side view of the exhaust passage control valve as seen in the direction of an arrow IV in FIG. 2.
Figure 5:
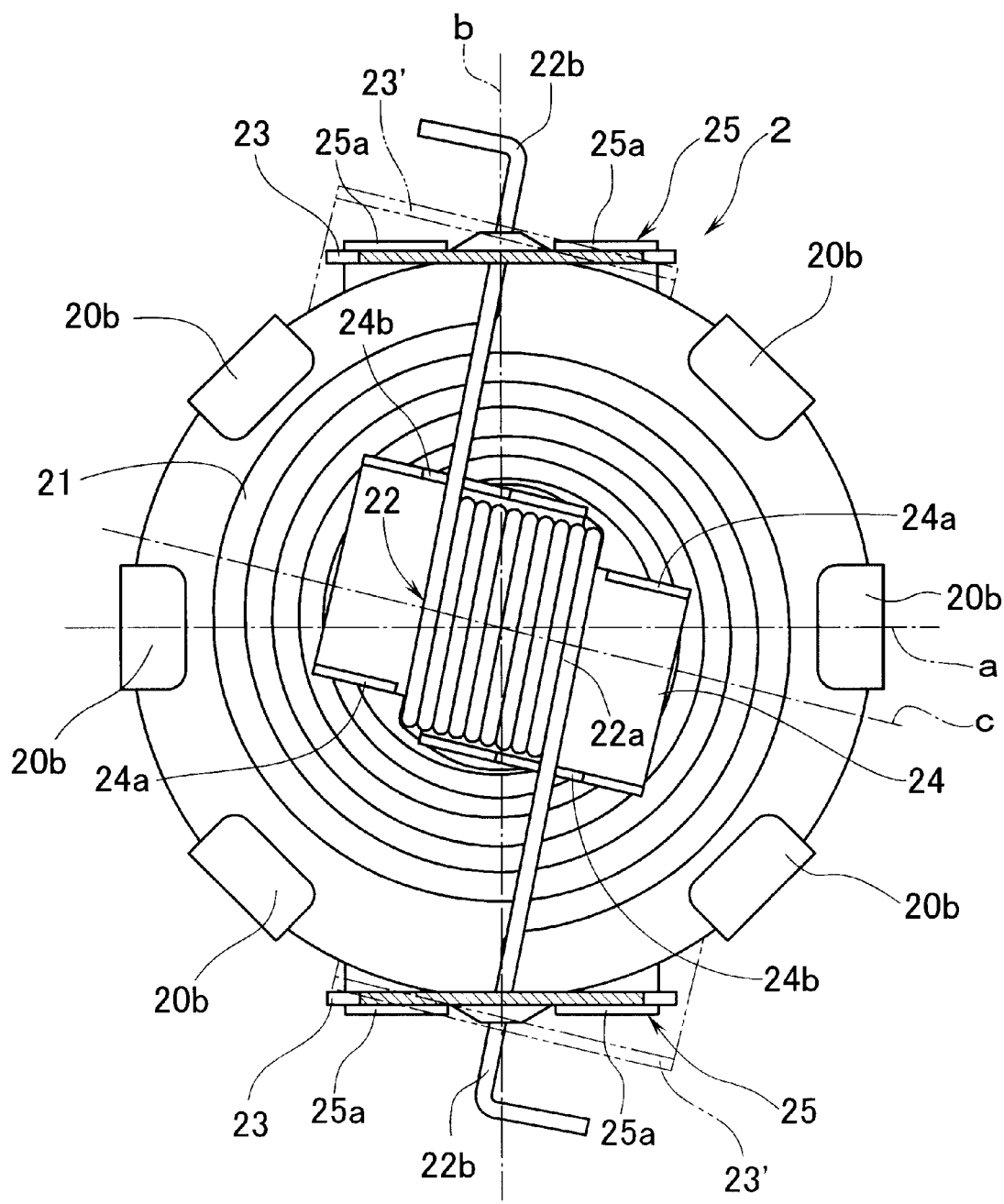
FIG. 5 is a cross-sectional view taken along the line V—V in FIG. 3.
Figure 6:
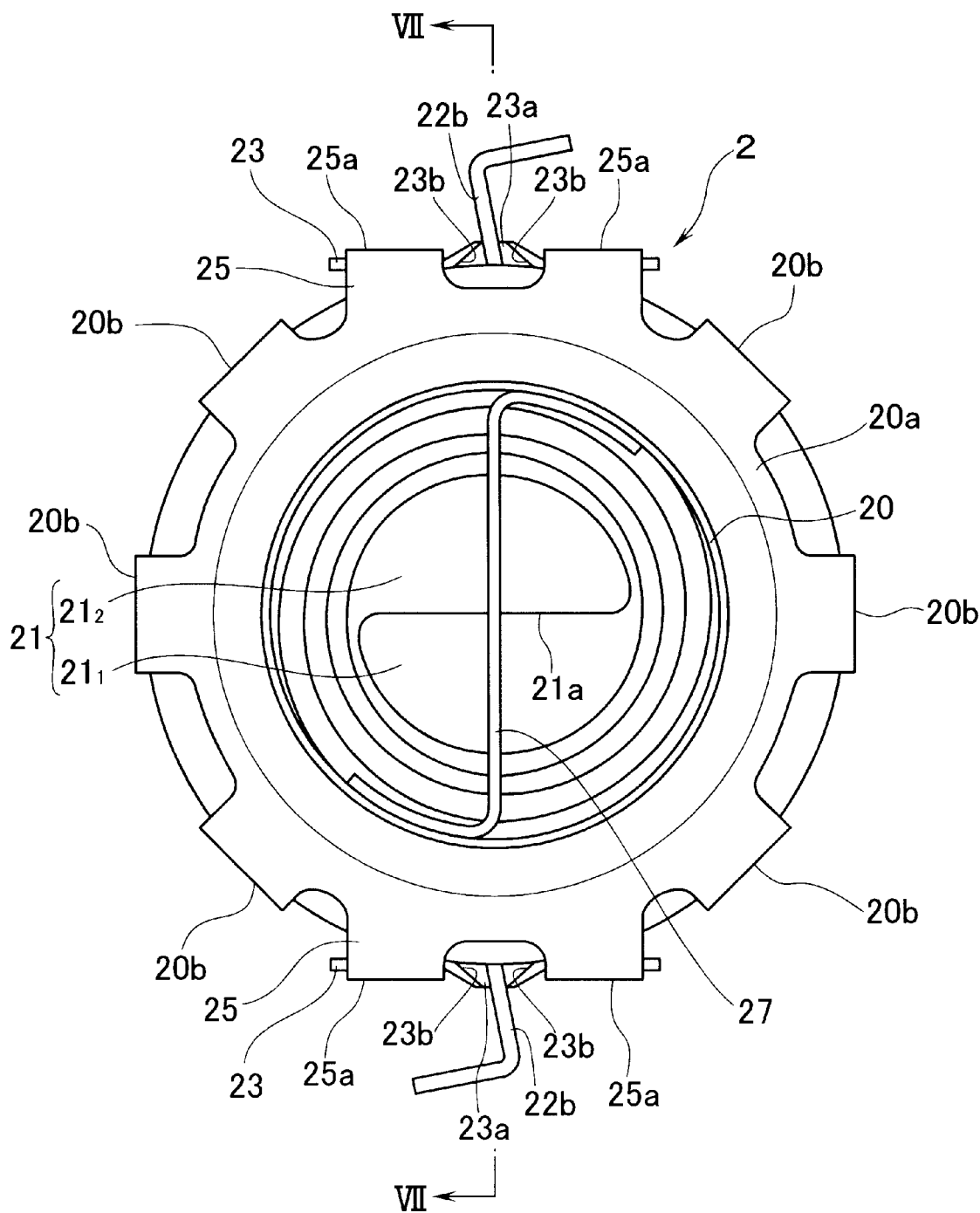
FIG. 6 is a rear view of the exhaust passage control valve as seen in the direction of an arrow VI in FIG. 3.

With reference to FIG. 1, numeral 1 denotes a silencer which is interposed in an exhaust system of an engine. The silencer 1 is made up of a cylindrical shell 10 and end walls $11_1$, $11_2$ which close one end and the other end, respectively, of the shell 10. Inside a main body of the silencer 1, there are provided a pair of first and second separators (partition walls) $12_1$, $12_2$ to thereby separate the space inside the main body of the silencer 1 into the following chambers: i.e., a first silencer chamber $13_1$ between the end wall $11_1$ on said one end and the first separator $12_1$; a second silencer chamber $13_2$ between the first separator $12_1$; and the second separator $12_2$; and a third silencer chamber $13_3$ between the second separator $12_2$ and the other end wall $11_2$. The silencer 1 is further provided with: an exhaust inlet pipe 14 which extends from said one end wall $11_1$ to the third silencer chamber $13_3$ through the first separator $12_1$ and the second separator $12_2$; an exhaust outlet pipe 15 which extends from the other end wall $11_2$ to the first silencer chamber $13_1$ through the second separator $12_2$ and the first separator $12_1$; and a pair of first inner pipes $16_1$, $16_1$ which communicates the first silencer chamber $13_1$ and the second silencer chamber $13_2$; a second inner pipe $16_2$ which extends from the third silencer chamber $13_3$ toward the first silencer chamber $13_1$ through the second separator $12_2$; and an exhaust passage control valve 2 which communicates the second inner pipe $16_2$ with the first silencer chamber $13_1$.

That portion of the exhaust inlet pipe 14 which is positioned inside the second silencer chamber $13_2$, there are formed a large number of perforations 14a. The exhaust gases which come in from the exhaust inlet pipe 14 flow into the exhaust outlet pipe 15 through the perforations 14a, the second silencer chamber $13_2$, the first inner pipes $16_1$, $16_1$ and the first silencer chamber $13_1$. It is thus so arranged that an expansion silencing effect can be obtained in the second silencer chamber $13_2$ and the first silencer chamber $13_1$. In addition, that portion of the exhaust inlet pipe 14 which is positioned inside the third silencer chamber $13_3$, there are formed a large number of perforations 14b. It is thus so arranged that a resonance silencing effect can normally be obtained in the third silencer chamber $13_3$.

The exhaust passage control valve 2 is arranged to be opened when the exhaust-gas pressure has risen due to a high-speed rotation of the engine. Once the exhaust passage control valve 2 is opened, a bypass passage which is communicated from the third silencer chamber $13_3$ to the first silencer chamber $13_1$ through the second inner pipe $16_2$ is opened to passage. As a result, the flow passage of the exhaust gases from the exhaust inlet pipe 14 is divided into the following two passages or routes, i.e., one route being through the second silencer chamber $13_2$, the first inner pipes $16_1$, $16_1$ and the first silencer chamber $13_1$ to the exhaust outlet pipe 15; and the other route being through the third silencer chamber $13_3$, the bypass passage, and the first silencer chamber $13_1$ to the exhaust outlet pipe 15. In this manner, the decrease in the engine output can be prevented.

The exhaust passage control valve 2 comprises: as shown in FIGS. 2 through 5, a housing 20 through which the exhaust gases from the second inner pipe $16_2$ flow; a valve element 21 which is mounted on the housing 20; and a valve spring 22 which urges the valve element 21 toward a closing side of the exhaust passage control valve 2. This valve 2 opens when the exhaust-gas pressure has exceeded a pressure (valve open set pressure) which corresponds to a set load of the valve spring 22 at an initial state (valve-closed state).

The housing 20 is made up of a tubular member which is fitted onto the second inner pipe $16_2$. That front end of the housing 20 which protrudes into the first silencer chamber $13_1$ is expanded in diameter to thereby form a flange. This flange constitutes an annular valve seat portion 20a.

Figure 8:
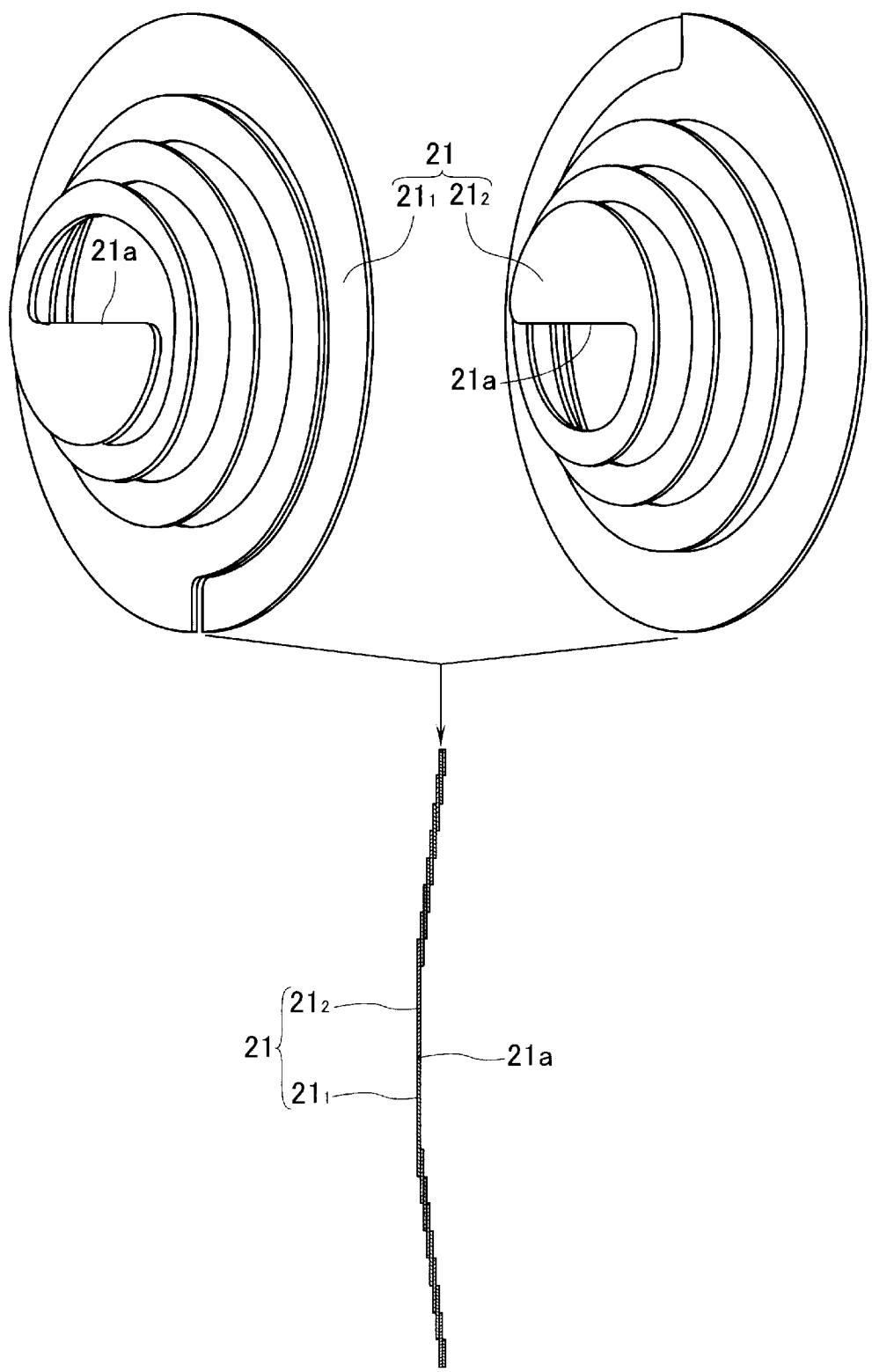
FIG. 8 is a schematic view showing the method of assembling a valve element.

The valve element 21 is made up of a spiral valve element whose peripheral portion (outer circumferential portion) is seated onto the valve seat portion 20a. The valve is arranged to be opened when the valve element 21 is extended in an axial direction of the spiral from the valve-closed state in which each of the wound portions of the outer circumference and the inner circumference of the spiral are overlapped with each other. The valve element 21 may be formed by a single spiral plate, but the following arrangement is employed in this embodiment. Namely, as shown in FIG. 8, a pair of spiral plates $21_1$, $21_2$ are combined into a double-spiral shape. A central portion of the semicircle of each of the spiral plates $21_1$, $21_2$ is butt-welded to each other at a chord portion 21a of the semicircle to thereby constitute the valve element 21 of the spiral shape. The outer circumferential portions of both the spiral plates $21_1$, $21_2$ are placed one on top of the other (i.e., overlapped) and are then seated onto the valve seat portion 20a. Claw pieces 20b which are formed in a plurality of portions in the outer circumference of the valve seat portion 20a are caulked to fix the outer circumferential portion of both the spiral plates $21_1$, $21_2$ to the valve seat portion 20a.

The valve spring 22 is constituted by a helical torsion spring having a coiled cylindrical body portion 22a and an arm portion 22b which lies on each end of the coiled cylindrical body portion 22a. A pair of first spring receiving members 23, 23 are provided on those portions of the housing 20 which lie on circumferentially opposite sides of the valve seat portion 20a. The arm portions 22b, 22b on respective ends of the coiled cylindrical body portion 22a are engaged with the pair of first spring receiving members 23, 23 so as to be slidable in a longitudinal direction of the arm portions 22b, 22b. In the central portion of the valve element 21, there is provided a second spring receiving member 24. The coiled cylindrical body portion 22a of the valve spring 22 is supported by the second spring receiving member 24. In this arrangement, the valve element 21 is urged through the coiled cylindrical body portion 22a in the direction of closing the valve 2 by a deflection reaction force of the arm portions 22b, 22b of the valve spring 22.

In order to obtain opening and closing characteristics of the valve with little or no transient state, i.e., the characteristics in that the valve opens all of a sudden or rapidly once the exhaust-gas pressure has reached a predetermined value and closes at a stretch once the exhaust-gas pressure has become smaller than the predetermined value, it becomes necessary to set the spring constant of the valve spring 22 to a low value. According to the present embodiment, once the coiled cylindrical body portion 22a of the valve spring 22 displaces toward the opening direction of the valve element 21, the arm portions 22b, 22b of the valve spring 22 slide relative to the first spring receiving members 23, 23. The effective length of the arm portions 22b, 22b which generate the deflection reaction force becomes longer. Therefore, the deflection reaction force of the arm portion 22b does not increase so much and, as a consequence, the spring constant becomes low. Further, accompanied by the movement of the valve element 21, sliding frictions of the arm portions 22b, 22b occur with the first spring receiving members 23, 23 and frictions occur among respective spirals of the coiled wire member of the coiled cylindrical body portion 22a. Therefore, a vibration dampening effect due to the frictions can be obtained, and the vibrations between opening state and closing state of the valve element 21 can be effectively prevented.

In this embodiment, the first spring receiving members 23, 23 are disposed in line symmetry with a predetermined first diametrical line "a" of the valve element 23. Further, as seen in a direction of winding of the spiral of the valve element 21 (i.e., in the direction of axis of opening and closing of the valve 2), each of the arm portions 22b, 22b of the valve spring 22 is arranged to cross, at an angle at each of the first spring receiving members 23, with that second diametrical line b of the valve element 21 which crosses at a right angle with the first diametrical line "a." In other words, the coiled cylindrical body portion 22a of the valve spring 22 is supported by the second spring receiving member 24 such that a center line c of the coiled cylindrical body portion 22a and the first diametrical line "a" cross each other at a predetermined angle. The following arrangement may also be considered. Namely, as shown by imaginary lines in FIG. 5, on those portions of the housing 20 which lie at one circumferential side of the valve seat portion 20a and at the other circumferential side of the valve seat portion 20a, a pair of first spring receiving members 23', 23' are provided in a position offset to longitudinally one direction and the other direction, respectively, of the coiled cylindrical body portion 22a so as to extend along a plane which is parallel to the center line c of the coiled cylindrical body portion 22a of the valve spring 22. Each of the arm portions 22b, 22b of the valve spring 22 is then engaged at a right angle with each of the first spring receiving members 23', 23'. In this arrangement, however, the amount of diametrically outward protrusion of the first spring receiving member 23' relative to the valve seat portion 20a becomes large and the valve consequently becomes large in size. In the present embodiment, on the other hand, the amount of diametrically outward protrusion of the first spring receiving member 23 relative to the valve seat portion 20a becomes small. It is therefore advantageous in minimizing the size of the valve.

Each of the first spring receiving members 23, 23 is constituted by a member which is other than the housing 20. Each of the first spring receiving members 23, 23 is connected to that mounting portion 25 for mounting each of the first receiving members 23, 23 which is formed in the housing 20. The mounting portion 25 is constituted by a pair of tongue pieces 25a, 25a which extend in the direction of opening and closing the valve element 21. Each of the first spring receiving members 23, 23 is formed so as to contact both the tongue pieces 25a, 25a. Each of the first spring receiving members 23, 23 is connected by welding in a state in which each of the first spring receiving members 23, 23 is overlapped with the tongue pieces 25a, 25a in an arbitrary length in the direction of opening and closing the valve element 21. By changing the length of overlapping of the first spring receiving members 23, 23 with a mounting portion 25 which is made up of the tongue pieces 25a, 25a, the amount of deflection at an initial state of the arm portions 22b, 22b of the valve spring 22, i.e., the set load of the valve spring 22, varies. Therefore, the exhaust passage control valve 2 with different valve opening set pressures can be obtained only by changing the length of overlapping of the first spring receiving members 23, 23 with the mounting portion 25, without replacing the valve spring 22 and the first spring receiving members 23, 23. It is thus possible to commonly use the valve constituting parts to thereby reduce the cost.

In a portion which is positioned between both the tongue pieces 25a, 25a at an end, as seen in the closing direction of the valve element 21, of each of the first spring receiving members 23, 23, there is formed a recessed portion 23a which recedes in the opening direction of the valve element 21. Each of the arm portions 22b, 22b is engaged with this recessed portion 23a. The recessed portion 23a is provided with oblique sides 23b, 23b which cross the inner side edges of both the tongue pieces 25a, 25a at oblique angles. Therefore, each of the arm portions 22b, 22b of the valve spring 22 is guided by the oblique sides 23b, 23b to thereby surely engage with the central portion of the respective recessed portions 23a, 23a. Deviation in the setting load of the valve spring 22 due to the deviation in the engaged position of the arm portion 22b can thus be prevented.

Figure 7:
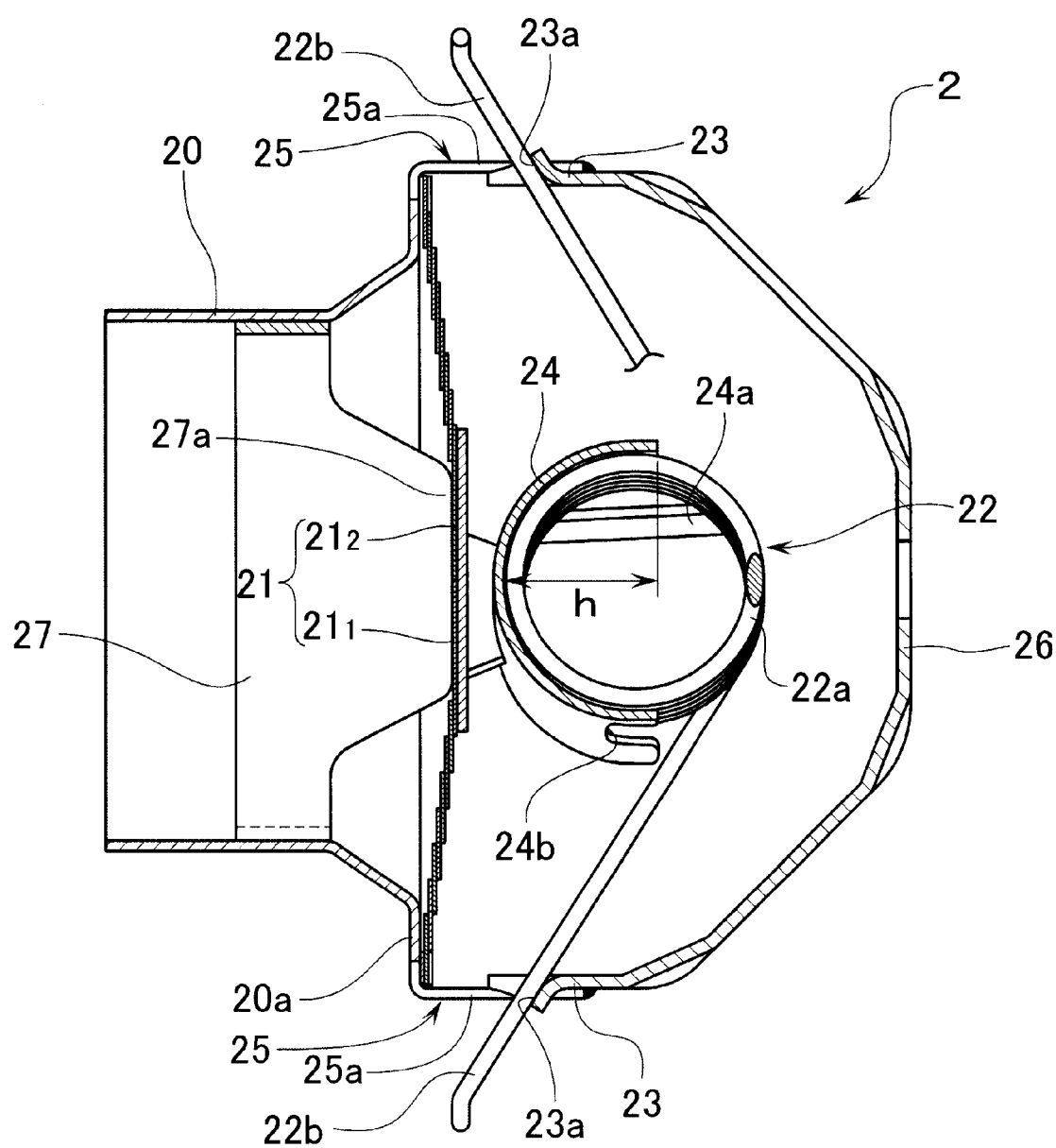
FIG. 7 is a cross-sectional view taken along the line VII—VII in FIG. 6.

The second spring receiving member 24 is formed into a recessed configuration of a trough shape which receives therein the coiled cylindrical body portion 22a of the valve spring 22. The outer circumferential surface of the coiled cylindrical body portion 22a is seated onto the second spring receiving member 24. It is considered to employ the following arrangement. Namely, the second spring receiving member is constituted by a member shaped like a bar (also called "a bar-shaped member") which is inserted into the coiled cylindrical body portion 22a, and that supporting member on the side of the valve element 21 which supports the bar-shaped member. In assembling, the bar-shaped member is inserted into the coiled cylindrical body portion 22a, and then the bar-shaped member is connected to the supporting member. This arrangement, however, takes much time in assembling. In the arrangement of the present embodiment, on the other hand, it is sufficient to cause the coiled cylindrical body portion 22a to be seated onto the second spring receiving member 24. The assembly work thus becomes easy. It is yet to be noted that simply causing the coiled cylindrical body portion 22a to be seated onto the second receiving member 24 of recessed trough shape may give rise to the following possibilities. Namely, as a result of opening and closing operation of the valve element 21, the coiled cylindrical body portion 22a inclines in the opening and closing direction of the valve element 21 to thereby assume an inverted posture, or the coiled cylindrical body portion 22a deviates in the lateral direction which is the direction in which the arm portion 22b extends. As a solution, in the present embodiment, the following arrangement has been made. Namely, on each end portion of the second spring receiving member 24, there is provided a stopper 24a shaped like a tongue piece which comes into contact with each end surface of the coiled cylindrical body portion 22a to thereby prevent the inclination thereof. In this manner, the coiled cylindrical body portion 22a can be prevented from assuming an inverted posture. Further, the depth h (see FIG. 7) of recession of the second sprig receiving member 24 is made larger than one-half of the diameter of the coiled cylindrical body portion 22a. According to this arrangement, even if the coiled cylindrical body portion 22a laterally deviates while rolling sidewise, the coiled spring body portion 22a will not drop out of the second spring receiving member 24 unless the entire coiled spring body portion 22a is lifted out of the second spring receiving member 24. The coiled spring body portion 22a can thus be stably supported by the second spring receiving member 24. On each edge portion on the diametrically opposite sides of the second spring receiving member 24, there is formed a notched portion 24b to prevent the interference of the arm portion 22b with the above-described edge portion.

The housing 20 is provided with: a valve-opening stopper 26 which restricts, by contact thereof with the coiled spring body portion 22a, the extension of the valve element 21 in the valve-opening direction beyond a predetermined amount; and a valve-closing stopper 27 which prevents, by contact with the central portion of the valve element 21, the valve element 21 from being recessed by bending in the valve-closing direction. These stoppers 26, 27 function to prevent the valve element 21 from being subjected to undue stresses which give an adverse effect to the durability of the valve element 21. The valve-opening stopper 26 is formed into a bridge shape which connects both the first spring receiving members 23, 23. Both the first spring receiving members 23, 23 and the valve-opening stopper 26 are formed into an integral part.

The valve-closing stopper 27 is constituted by a member of a plate shape which is fixed inside the housing 20 to lie along a plane crossing at a right angle with a plane including the valve seat portion 20*a*. In other words, the member of a plate shape lies parallel to the line of flow of the exhaust gases. It is thus so arranged that an increase in the flow resistance of the exhaust gases due to the presence of the valve-closing stopper 27 can be prevented. The valve-closing stopper 27 has formed therein a contact portion 27*a* which comes into contact with the central portion of the valve element 21. This contact portion 27*a* is formed in a manner to protrude beyond the plane including the valve seat portion 20*a*, in a direction in which the valve element 21 opens. It is thus so arranged that, in a valve-closed state in which each of the wound portions in the outer circumference and the inner circumference of the valve element 21 overlap each other, the central portion of the valve element 21 comes into contact with the contact portion 27*a*. The pair of spiral plates 21₁, 21₂ which constitute the valve element 21 are welded together, as explained hereinabove, at the chords 21*a*, 21*a* in the central portion of the semicircles. In order to prevent this welded portion from separating due to shocks to be received by the valve-closing stopper 27, the valve-closing stopper 27 is disposed so as to lie along a line which crosses, at an angle, the chords 21*a*, 21*a* which form the connecting portion.

Explanations have so far been made about an embodiment in which the present invention is applied to an exhaust passage control valve which is made up of a bypass valve to be disposed in the silencer 1. The present invention can also be applied to an exhaust passage control valve which is disposed in other portions of the exhaust systems of the engine.

As can be seen from the above explanations, according to the present invention, the spring constant can be made low without enlarging the valve spring. The vibrations between opening state and closing state of the valve element can also be effectively prevented.

It is readily apparent that the above-described exhaust passage control valve meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An exhaust passage control valve comprising:
   a housing through which exhaust gases from an engine pass:
      a valve element mounted on said housing;
      a valve spring for urging said valve element toward a closing side such that, when an exhaust-gas pressure has exceeded a predetermined value, said exhaust passage control valve is opened,
      said valve element being constituted into a spiral valve element whose outer circumferential portion is seated onto an annular valve seat portion of said housing such that said exhaust passage control valve is opened and closed by extension and contraction of said valve element in a direction of an axis of spiralling,
      wherein said valve spring is constituted by a helical torsion spring having a coiled cylindrical body portion, and an arm portion on each end of said coiled cylindrical body portion, and
      wherein said arm portions are engaged with a pair of spring receiving members so as to be slidable in a longitudinal direction of each of said arm portions, said pair of spring receiving members being provided in those portions of said housing which lie on circumferentially opposite sides of said valve seat portion to thereby urge said valve element through said coiled cylindrical body portion toward the closing side.

\* \* \* \* \*

UNITED STATES PATENT AND TRADEMARK OFFICE
CERTIFICATE OF CORRECTION

| | | |
|---|---|---|
| PATENT NO. | : 6,338,246 B2 | Page 1 of 1 |
| DATED | : January 15, 2002 | |
| INVENTOR(S) | : Eguchi, Yoshihiko, Tsuda, Kazuhiro, Fujishiro, Masamichi, Fukazawa, Jun, Ichikawa and Shoji | |

It is certified that error appears in the above-identified patent and that said Letters Patent is hereby corrected as shown below:

<u>Title page,</u>
Item [75], Inventors, please delete "Kazuhiko Tsuda" and insert -- Kazuhiro Tsuda --.

Signed and Sealed this

Twentieth Day of August, 2002

*Attest:*

JAMES E. ROGAN
*Attesting Officer*     *Director of the United States Patent and Trademark Office*